A. H. TALLYN.
CUTTING TOOL.
APPLICATION FILED APR. 24, 1916.
1,205,058.
Patented Nov. 14, 1916.
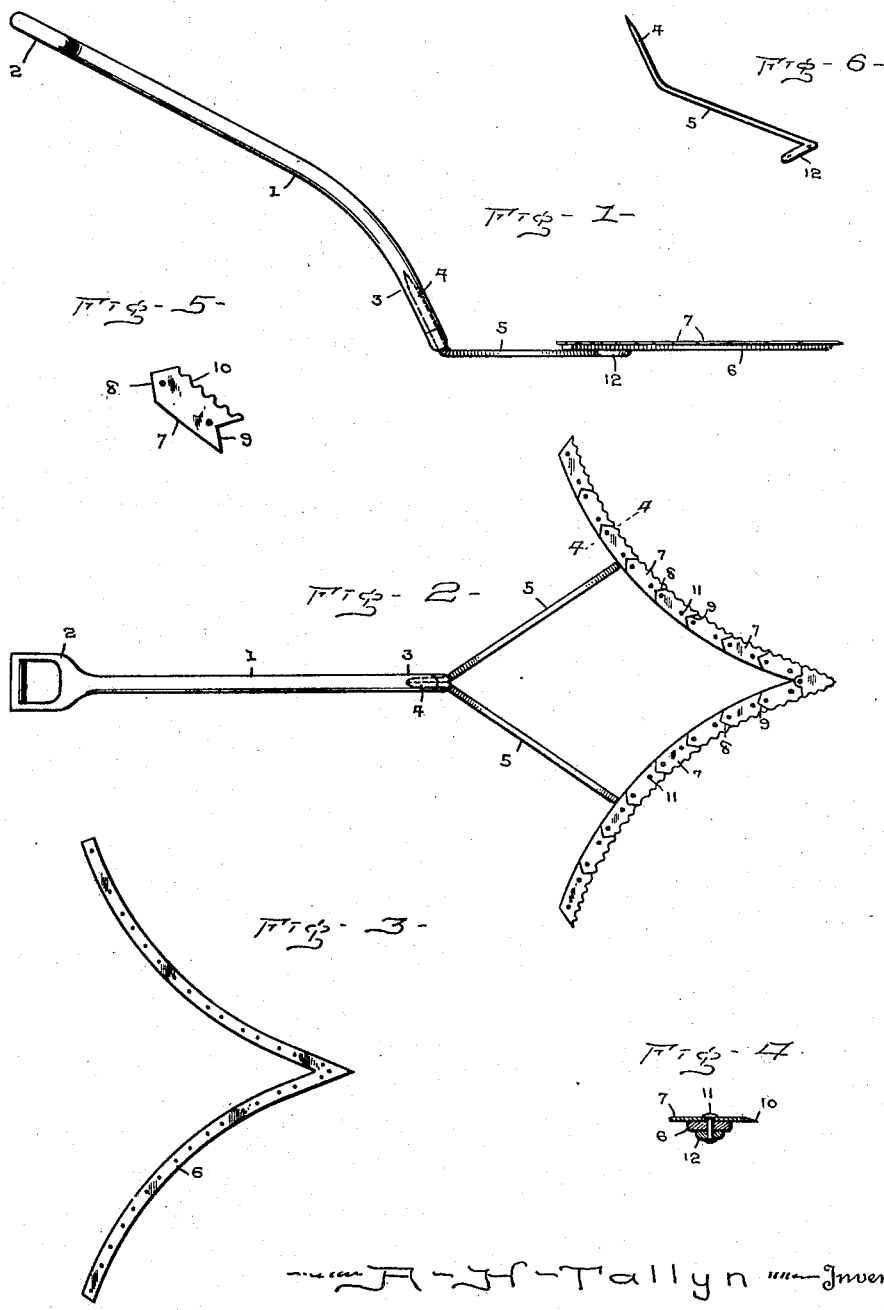

UNITED STATES PATENT OFFICE.

ARTHUR H. TALLYN, OF BENSON, ILLINOIS.

CUTTING-TOOL.

1,205,058.  Specification of Letters Patent.  Patented Nov. 14, 1916.

Application filed April 24, 1916. Serial No. 93,233.

*To all whom it may concern:*

Be it known that I, ARTHUR H. TALLYN, a citizen of the United States, residing at Benson, in the county of Woodford and State of Illinois, have invented certain new and useful Improvements in Cutting-Tools; and I do hereby declare the following to be a full, clear, and exact description of the invention, such as will enable others skilled in the art to which it appertains to make and use the same.

My invention relates to new and useful improvements in cutting tools and more particularly to that class adapted to be used for cutting weeds, straw, hay, or similar articles, and my object is to provide a device of this class adapted to be manually operated.

A further object is to so construct the cutting device with respect to the handle that the cutting blades may be operated when in a vertical or horizontal position.

A further object is to form the cutting blades of a plurality of sections and attach the same to a supporting bar.

A further object is to so assemble the sections that a substantially V-shape structure will be formed. And a further object is to provide brace arms for attaching the cutting blades to the handle.

Other objects and advantages will be hereinafter set forth and more particularly pointed out in the accompanying specification.

In the accompanying drawings which are made a part of this application, Figure 1 is a side elevation of the cutting tool ready for use. Fig. 2 is a top plan view thereof. Fig. 3 is a plan view of the bar for supporting the sections of the cutting blades. Fig. 4 is an enlarged sectional view as seen on line 4—4 of Fig. 2. Fig. 5 is a plan view of one of the cutting sections, and Fig. 6 is a perspective view of one of the brace arms employed for attaching the cutting blades to the handle.

Referring to the drawings in which similar reference numerals designate corresponding parts throughout the several views, 1 indicates a handle which may be constructed in any preferred manner, one end thereof having a hand hold 2, while the opposite end 3 is curved downwardly to receive the shank ends 4 of brace arms 5, said brace arms extending outwardly from each other and being attached to a substantially V-shape bar 6.

Attached to the bar 6 are a plurality of sections 7, one end of each section having tapered faces 8 while the opposite end thereof is provided with a tapered recess 9 for the reception of the tapered end of the next succeeding section. The forward edge of each section is provided with a plurality of serrations or convolutions 10 which provide cutting edges, said cutting edges extending the full length of the blades formed by assembling the sections upon the bar 6.

The arms of the bar 6 are gradually curved from the apex of the bar to the outer ends thereof so that when the sections are assembled and attached to the bar, the cutting edges are likewise curved from the apex of the blades to the outer ends thereof, this manner of constructing the blades permitting a substantially shearing action as the blades are forced into engagement with the weeds, or other articles to be severed. The sections of the blades are attached to the bar 6 in any suitable manner, as by introducing rivets 11 through registering openings in the blade sections and bar, the brace arms 5 having lateral extensions 12, which extensions are likewise attached to the bar 6 by the rivets 11.

The sections 7 at the apex of the blades is substantially dart-shaped and provided with the serrations 10 on the tapered faces thereof so that the blades may be readily forced through the weeds, or other articles to be severed, the construction of said central section providing a sharp point, at the forward extremity of the blades.

When the cutting device is to be used for severing weeds, it is disposed in the position shown in Fig. 1, when by moving the blades forwardly and sliding the structure over the ground, any weeds in the path of the blades will be easily severed.

When the cutting device is to be used for cutting hay, straw, or the like when in a stack or in a mow, the handle 1 is moved upwardly until the cutting blades are in a substantially vertical position when by applying downward pressure on the handle the blades will be forced through the hay or straw and the particles thereof severed.

This device can be very cheaply constructed and should any of the sections of the blades become broken they can be readily renewed, and it will likewise be seen that the serrations or convolutions forming the cutting edges of the blades may be readily ground in order to sharpen the same.

Having thus fully described my invention what I claim as new and desire to secure by Letters Patent of the United States, is:—

1. A cutting tool of the class described, comprising a substantially V-shaped bar, the arms of which are arcuately curved rearwardly and outwardly, a plurality of cutting blades attached to said V-shaped bar and arranged in adjoining relation throughout the length of the arcuate arms, each cutting blade having a cutting edge projecting forwardly of the arm to which it is attached, a handle, and diverging brace arms extending from the handle and attached to the arcuate arms intermediate their ends.

2. A cutting tool of the class described, comprising a substantially V-shaped bar, the arms of which are arcuately curved rearwardly and outwardly, a plurality of arcuate cutting blades attached to said V-shaped bar, each cutting blade having a cutting edge projecting forwardly of the arm to which it is attached, a handle, and diverging brace arms extending from the handle and attached to the arcuate arms intermediate their ends.

3. A cutting tool of the class described, comprising a substantially V-shaped bar, the arms of which are arcuately curved rearwardly and outwardly, a plurality of arcuate cutting blades attached to said V-shaped bar and arranged in adjoining relation throughout the length of the arcuate arms, each cutting blade having a cutting edge projecting forwardly of the arms to which it is attached, a handle, and diverging brace arms extending from the handle and attached to the arcuate arms intermediate their ends.

In testimony whereof I have signed my name to this specification in the presence of two subscribing witnesses.

ARTHUR H. TALLYN.

Witnesses:
F. N. TALLYN,
F. C. TUCKER.

Copies of this patent may be obtained for five cents each, by addressing the "Commissioner of Patents, Washington, D. C."